(12) United States Patent
Hashimoto et al.

(10) Patent No.: US 11,015,045 B2
(45) Date of Patent: May 25, 2021

(54) RESIN COMPOSITION, PRODUCT COMPRISING THE SAME, AND MULTILAYER STRUCTURE

(71) Applicant: THE NIPPON SYNTHETIC CHEMICAL INDUSTRY CO., LTD., Osaka (JP)

(72) Inventors: Honoka Hashimoto, Osaka (JP); Shouichi Kani, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/189,309

(22) Filed: Nov. 13, 2018

(65) Prior Publication Data

US 2019/0077945 A1 Mar. 14, 2019

Related U.S. Application Data

(63) Continuation of application No. PCT/JP2017/019451, filed on May 25, 2017.

(30) Foreign Application Priority Data

May 26, 2016 (JP) .............................. JP2016-104846

(51) Int. Cl.
| | | |
|---|---|---|
| C08L 23/08 | (2006.01) | |
| C08K 5/101 | (2006.01) | |
| C08L 29/04 | (2006.01) | |
| B32B 27/28 | (2006.01) | |
| C08L 23/12 | (2006.01) | |
| B29B 9/12 | (2006.01) | |
| C08L 23/26 | (2006.01) | |
| B29B 9/06 | (2006.01) | |

(52) U.S. Cl.
CPC ............ *C08L 23/0869* (2013.01); *B29B 9/12* (2013.01); *B32B 27/28* (2013.01); *C08K 5/101* (2013.01); *C08L 23/0861* (2013.01); *C08L 23/12* (2013.01); *C08L 23/26* (2013.01); *C08L 29/04* (2013.01); *B29B 9/06* (2013.01)

(58) Field of Classification Search
CPC ... B29B 9/12; B29B 9/06; C08L 29/04; C08L 23/12; C08L 23/0869; C08L 23/0861; C08L 23/26; C08K 5/101; B32B 27/28
USPC ......................................................... 524/284
See application file for complete search history.

(56) References Cited

U.S. PATENT DOCUMENTS

| | | | |
|---|---|---|---|
| 5,744,547 | A | 4/1998 | Moritani et al. |
| 2012/0009431 | A1 | 1/2012 | Kazeto |
| 2013/0040087 | A1* | 2/2013 | Kazeto ................. C08K 5/09 428/36.5 |
| 2013/0040157 | A1 | 2/2013 | Igarashi et al. |
| 2016/0229987 | A1 | 8/2016 | Kawai et al. |
| 2018/0319965 | A1* | 11/2018 | Seno ..................... C08F 36/14 |

FOREIGN PATENT DOCUMENTS

| | | |
|---|---|---|
| CN | 102906186 A | 1/2013 |
| EP | 2554592 A1 | 2/2013 |
| EP | 2862898 A1 | 4/2015 |
| EP | 3375818 A1 | 9/2018 |
| JP | H09-71620 A | 3/1997 |
| JP | 2000-272243 | 10/2000 |
| JP | 2015-083376 | 4/2015 |
| WO | 2011/118762 | 9/2011 |
| WO | 2015/041258 | 3/2015 |
| WO | 2017/082063 A1 | 5/2017 |

OTHER PUBLICATIONS

European Search Report, European Patent Office, Application No. 17802858.5, dated May 25, 2019, 7 pages.
International Search Report for International Application No. PCT/JP2017/019451 dated Aug. 15, 2017 with English translation.
International Preliminary Report on Patentability for International Application No. PCT/JP2017/019451 dated Dec. 6, 2018 with English translation.
European Office Action issued for European Patent Application No. 17802858.5 dated Oct. 1, 2019.
Singaporean Office Action issued for Singaporean Patent Application No. 11201809807S dated Oct. 21, 2019.
Taiwanese OA issued in Patent App. No. TW 106117303, Nov. 12, 2020, English translation.
Chinese Office Action issued for CN Patent Application No. 201780031254.1, dated Aug. 21, 2020, English translation.
Singaporean Office Action issued for Singaporean Patent Application No. 11201809807S, dated Aug. 24, 2020.
JP Office Action issued for JP Patent Application No. 2017-528605, dated Mar. 23, 2021, English translation.
TW Rejection Decision issued for TW Patent Application No. 106117303, dated Jan. 26, 2021, English translation.

* cited by examiner

*Primary Examiner* — Angela C Scott
(74) *Attorney, Agent, or Firm* — Greenblum & Bernstein, P.L.C.

(57) ABSTRACT

A resin composition can be formed into a product excellent in coloration resistance even if being subjected to a melt-forming process and the like a plurality of times and hence frequently subjected to thermal history. A product formed from the resin composition, and a multilayer structure are also provided. The resin composition contains: (A) a saponified ethylene-vinyl ester copolymer; and (B) a sorbic acid ester; wherein the sorbic acid ester (B) is present in a proportion of 0.001 to 10 ppm based on the total weight of the saponified ethylene-vinyl ester copolymer (A) and the sorbic acid ester (B).

3 Claims, No Drawings

RESIN COMPOSITION, PRODUCT COMPRISING THE SAME, AND MULTILAYER STRUCTURE

RELATED APPLICATION

This application is a continuation of International Application No. PCT/JP2017/019451, filed on May 25, 2017, which claims priority to Japanese Patent Application No. 2016-104846, filed on May 26, 2016, the entire contents of each of which are hereby incorporated by reference.

TECHNICAL FIELD

The present disclosure relates to a resin composition containing a saponified ethylene-vinyl ester copolymer (hereinafter sometimes abbreviated as "EVOH"), a product formed from the resin composition, and a multilayer structure. More specifically, the present disclosure relates to a formed product and a multilayer structure including a resin composition layer, which are excellent in coloration resistance even if being subjected to a melt-forming process and the like a plurality of times and hence, frequently subjected to thermal history.

BACKGROUND ART

The EVOH has very strong intermolecular forces due to hydrogen bonds between hydroxyl groups present at its polymer side chains and, hence, has a higher crystallinity. Even in amorphous portions of the EVOH, the intermolecular forces are strong. Therefore, gas molecules and the like cannot permeate through a film, a bottle, or other products formed from the EVOH. For this reason, the products formed from the EVOH are excellent in gas barrier property. Therefore, the EVOH is conventionally widely used for packaging materials because of its excellent gas barrier property and excellent transparency.

An example of the packaging material is a multilayer film structure including an EVOH film layer provided as an intermediate layer, and resin layers of a thermoplastic resin provided as inner and outer layers on opposite sides of the EVOH film layer. With its excellent gas barrier property and transparency, as described above, the multilayer structure is utilized as films and sheets for packaging materials such as a food packaging material, a pharmaceutical product packaging material, an industrial chemical packaging material, and an agricultural chemical packaging material, containers such as bottles, and other formed products.

These packaging materials and containers can be melt-formed from the EVOH in a known method. It is known that the EVOH is liable to be colored by the melt-forming. This is supposedly because the EVOH contains a greater number of hydroxyl groups, and the hydroxyl groups are thermally dehydrated to generate a polyene structure at the main chains of the EVOH.

As for this problem, it is known that an EVOH prepared by adding 0.000001 to 1 wt. % (0.01 to 10000 ppm) of a conjugated polyene compound having a boiling point of 20° C. or higher to a solution of an ethylene-vinyl ester copolymer (a precursor of the EVOH) after polymerization is less susceptible to coloration when being formed into an EVOH film (see PTL 1). In PTL 1, it is stated that an EVOH was prepared by adding a predetermined amount of sorbic acid to a solution of an ethylene-vinyl ester copolymer after polymerization and, when a film having a sorbic acid concentration of 0.002 wt. % (20 ppm) was melt-formed from the EVOH by an extruder set at 230° C., the film had an absorbance of lower than 0.10 at a wavelength of 360 nm in Example 3.

RELATED ART DOCUMENT

Patent Document

PTL 1: JP-A-HEI9(1997)-71620

SUMMARY OF INVENTION

The art disclosed in PTL 1 can suppress the coloration of the product formed from the EVOH after the polymerization. However, where the formed product is recycled to be formed into another product or a product is melt-formed from a resin composition prepared by melt-kneading another resin and an additive with the EVOH for adjustment of resin properties, the EVOH is subjected to thermal history a plurality of times. Therefore, the resulting formed product is more susceptible to coloration, and the coloration degree tends to be increased. Hence, there is a demand for an EVOH less susceptible to coloration even under such severe conditions.

In view of the foregoing, it is an object of the present disclosure to provide a resin composition that can be formed into a product excellent in coloration resistance even if being subjected to a melt-forming process and the like a plurality of times and hence frequently subjected to thermal history, and to provide a product formed from the resin composition, and a multilayer structure.

In view of the foregoing, the inventors conducted intensive studies. As a result, the inventors found that a resin composition containing a specific very small proportion (0.001 to 10 ppm) of a sorbic acid ester based on the total weight of the EVOH and the sorbic acid ester is excellent in coloration resistance even if being frequently subjected to thermal history due to melt-forming and the like.

<Inventive Aspects>

According to a first inventive aspect, there is provided a resin composition, which contains: (A) an EVOH; and (B) a sorbic acid ester; wherein the sorbic acid ester (B) is present in a proportion of 0.001 to 10 ppm based on the total weight of the EVOH (A) and the sorbic acid ester (B).

According to a second inventive aspect, the sorbic acid ester (B) contains an alkoxy group having a carbon number of 1 to 5.

According to a third inventive aspect, there is provided a product formed from the resin composition. According to a fourth inventive aspect, there is provided a multilayer structure including at least one resin composition layer formed from the resin composition.

The resin composition according to the present disclosure contains the EVOH (A) and the sorbic acid ester (B), and the sorbic acid ester (B) is present in a proportion of 0.001 to 10 ppm based on the total weight of the EVOH (A) and the sorbic acid ester (B) in the resin composition. Therefore, the resin composition is excellent in coloration resistance.

Where the carbon number of the alkoxy group of the sorbic acid ester (B) is 1 to 5, the resin composition is better in coloration resistance.

The product formed from the resin composition is excellent in coloration resistance.

The multilayer structure including at least one resin composition layer formed from the resin composition is excellent in coloration resistance.

DESCRIPTION OF EMBODIMENTS

The present disclosure will hereinafter be described in detail by way of preferred embodiments thereof. However, it should be understood that these preferred embodiments are illustrative of the disclosure.

The present disclosure provides a resin composition containing: (A) an EVOH; and (B) a sorbic acid ester. In the present disclosure, the sorbic acid ester (B) is present in a specific very small proportion (0.001 to 10 ppm) based on the total weight of the EVOH (A) and the sorbic acid ester (B).

<EVOH (A)>

The EVOH (A) to be used in the present disclosure will be described.

The EVOH (A) to be used in the present disclosure is generally a water-insoluble thermoplastic resin prepared by copolymerizing ethylene and a vinyl ester monomer and then saponifying the resulting copolymer. Known polymerization methods such as a solution polymerization method, a suspension polymerization method and an emulsion polymerization method may be used for the polymerization. A solution polymerization method using methanol as a solvent is generally used. The resulting ethylene-vinyl ester copolymer may be saponified by a known method.

The EVOH (A) to be used in the present disclosure mainly contains an ethylene structural unit and a vinyl alcohol structural unit, and further contains a small amount of a vinyl ester structural unit that remains unsaponified. The EVOH is also referred to as ethylene-vinyl alcohol copolymer.

Vinyl acetate is typically used as the vinyl ester monomer because it is easily commercially available and ensures a higher impurity removal efficiency in the production process. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have 3 to 20 carbon atoms, more preferably 4 to 10 carbon atoms, particularly preferably 4 to 7 carbon atoms. These vinyl esters may be used alone or, as required, a plurality of vinyl esters may be selected from these vinyl esters to be used in combination.

The EVOH (A) typically has an ethylene structural unit content of 20 to 60 mol %, preferably 25 to 50 mol %, particularly preferably 25 to 35 mol %, as measured in conformity with ISO14663. If the ethylene structural unit content is too low, the EVOH tends to be poorer in high-humidity gas barrier property and melt formability. If the ethylene structural unit content is too high, on the other hand, the EVOH tends to be poorer in gas barrier property.

The EVOH (A) typically has a vinyl ester saponification degree of 90 to 100 mol %, preferably 95 to 100 mol %, particularly preferably 99 to 100 mol %, as measured in conformity with JIS K6726 (by using a solution prepared by homogenously dissolving the EVOH in a water/methanol solvent). If the saponification degree is too low, the EVOH tends to be poorer in gas barrier property, heat stability, moisture resistance and the like.

The EVOH (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR is too high, the EVOH tends to be poorer in film forming property. If the MFR is too low, the EVOH tends to have difficulty in melt extrusion. The EVOH (A) to be used in the present disclosure may further contain a structural unit derived from any of the following exemplary comonomers in a proportion that does not impair the effects of the present disclosure (e.g., in a proportion of not greater than 20 mol % based on the amount of the EVOH (A)).

The exemplary comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and derivatives of these hydroxyl-containing α-olefins including esterification products of these hydroxyl-containing α-olefins such as 3,4-diacyloxy-1-butene (e.g., 3,4-diacetoxy-1-butene), and acylation products of these hydroxyl-containing α-olefins such as 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; unsaturated acids such as acrylic acid, methacrylic acid, crotonic acid, (anhydrous) phthalic acid, (anhydrous) maleic acid, and (anhydrous) itaconic acid, and salts and C1 to C18 monoalkyl or dialkyl esters thereof; acrylamide compounds such as acrylamide, C1 to C18 N-alkylacrylamides, N,N-dimethylacrylamide, 2-acrylamidopropanesulfonic acid and salts thereof, and acrylamidopropyldimethylamine and acid salts and quaternary salts thereof; methacrylamide compounds such as methacrylamide, C1 to C18 N-alkyl methacrylamides, N,N-dimethylmethacrylamide, 2-methacrylamidopropanesulfonic acid and salts thereof, and methacrylamidopropyldimethylamine and acid salts and quaternary salts thereof; N-vinylamides such as N-vinylpyrrolidone, N-vinylformamide, and N-vinylacetamide; vinyl cyanides such as acrylonitrile and methacrylonitrile; vinyl ethers such as C1 to C18 alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilane compounds such as trimethoxyvinylsilane; halogenated allyl compounds such as allyl acetate and allyl chloride; allyl alcohol compounds such as allyl alcohol and dimethoxyallyl alcohol; and trimethyl-(3-acrylamido-3-dimethylpropyl)-ammonium chloride and acrylamido-2-methylpropanesulfonic acid, which may be used alone or in combination.

An EVOH prepared by copolymerization with any of the hydroxyl-containing α-olefins is preferred for excellent secondary formability. Particularly, an EVOH containing a primary hydroxyl group at its side chain is preferred, and an EVOH having 1,2-diol at its side chain is particularly preferred.

The EVOH having 1,2-diol at its side chain contains a 1,2-diol structural unit at its side chain. Specifically, the 1,2-diol structural unit is a structural unit represented by the following general formula (1).

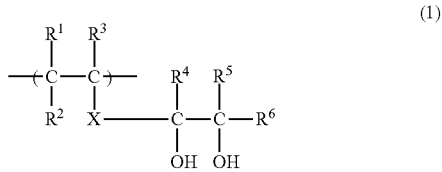

(1)

wherein $R^1$, $R^2$ and $R^3$ are each independently a hydrogen atom or an organic group, X is a single bond or a bonding chain, and $R^4$, $R^5$ and $R^6$ are each independently a hydrogen atom or an organic group.

In the 1,2-diol structural unit represented by the general formula (1), examples of the organic group include: saturated hydrocarbon groups such as a methyl group, an ethyl group, a n-propyl group, an isopropyl group, a n-butyl group, an isobutyl group, and a tert-butyl group; aromatic hydrocarbon groups such as a phenyl group and a benzyl group; and halogen atoms, a hydroxyl group, acyloxy groups, alkoxycarbonyl groups, carboxyl groups, and a sulfonic acid group.

In the general formula (1), $R^1$ to $R^3$ are each typically a hydrogen atom or a saturated hydrocarbon group having a carbon number of 1 to 30, preferably 1 to 15, further preferably 1 to 4, most preferably a hydrogen atom. In the general formula (1), $R^4$ to $R^6$ are each typically a hydrogen atom or an alkyl group having a carbon number of 1 to 30, preferably 1 to 15, further preferably 1 to 4, most preferably a hydrogen atom. Particularly, $R^1$ to $R^6$ are most preferably all hydrogen atoms.

In the structural unit represented by the above general formula (1), X is typically a single bond.

As long as the effects of the present disclosure are not impaired, X may be a bonding chain. Examples of the bonding chain include: hydrocarbon chains such as alkylenes, alkenylenes, alkynylenes, phenylene, and naphthylene (which may be substituted with a halogen such as fluorine, chlorine or bromine); ether-bond containing structures such as —O—, —($CH_2O$)$_m$—, —($OCH_2$)$_m$—, and —($CH_2O$)$_m$$CH_2$—; carbonyl group-containing structures such as —CO—, —COCO—, —CO($CH_2$)$_m$CO—, and —CO($C_6H_4$)CO—; hetero atom-containing structures including sulfur atom-containing structures such as —S—, —CS—, —SO—, and —$SO_2$—, nitrogen atom-containing structures such as —NR—, —CONR—, —NRCO—, —CSNR—, —NRCS—, and —NRNR—, and phosphorus atom-containing structures such as —$HPO_4$—; and metal atom-containing structures including silicon atom-containing structures such as —Si(OR)$_2$—, —OSi(OR)$_2$—, and —OSi(OR)$_2$O—, titanium atom-containing structures such as —Ti(OR)$_2$—, —OTi(OR)$_2$—, and —OTi(OR)$_2$O—, and aluminum atom-containing structures such as —Al(OR)—, —OAl(OR)—, and —OAl(OR)O— (wherein R is independently a given substituent group, preferably a hydrogen atom or an alkyl group, and m is a natural number, typically 1 to 30, preferably 1 to 15, more preferably 1 to 10). From the viewpoint of the stability during production or during use, X is preferably —$CH_2OCH_2$— or a C1 to C10 hydrocarbon chain, more preferably a C1 to C6 hydrocarbon chain, particularly preferably has a carbon number of 1.

In the most preferred structure for the 1,2-diol structural unit represented by the general formula (1), $R^1$ to $R^6$ are all hydrogen atoms, and X is a single bond. That is, a structural unit represented by the following structural formula (1a) is most preferred.

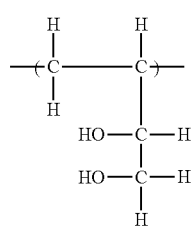

(1a)

Where the EVOH (A) contains the 1,2-diol structural unit represented by the above general formula (1), the 1,2-diol structural unit content is typically 0.1 to 20 mol %, preferably 0.1 to 15 mol %, particularly preferably 0.1 to 10 mol %.

The EVOH (A) may be a mixture of different EVOHs. These EVOHs may have different ethylene structural unit contents, different contents of the 1,2-diol structural unit represented by the general formula (1), different saponification degrees, and different melt flow rates (MFRs), and contain different comonomer components.

A "post-modified" EVOH such as an urethanized, acetalized, cyanoethylated or oxyalkylenated EVOH may be used as the EVOH (A) in the present disclosure.

<Sorbic acid ester (B)>

Addition of the specific very small proportion of the sorbic acid ester (B) creates a remarkable coloration suppressing effect on the inventive resin composition. More specifically, the coloration is suppressed even if the EVOH is subjected to the thermal history a plurality of times when a product formed from a resin composition containing the EVOH is recycled to be formed into another product or when a product is melt-formed from a resin composition prepared by melt-kneading the EVOH with another resin and an additive for adjustment of resin properties.

The sorbic acid ester has conjugated double bonds and, therefore, the coloration of the resin composition is suppressed supposedly because radicals generated during the heating are trapped by the conjugated double bonds. The addition of the specific very small proportion of the sorbic acid ester creates the coloration suppressing effect supposedly because the radicals can be trapped at an early stage of the generation thereof. Further, the sorbic acid ester has a smaller polarity than sorbic acid and, therefore, it is supposedly easier to homogeneously disperse the sorbate in the resin.

In the present disclosure, where a product formed from the inventive resin composition or, particularly, a multilayer structure including layers of the inventive resin composition and some other resin (e.g., a polyamide resin or a known adhesive resin) is recycled through a melt-forming process, the sorbic acid ester (B) selected as an additive supposedly suppresses a reaction between the other resin and the EVOH (A), thereby contributing to the suppression of the coloration.

In addition, the sorbic acid ester (B) is blended in the specific very small proportion. Therefore, even if the EVOH (A) is subjected to the melt-forming process a plurality of times and hence frequently subjected to the thermal history or is recycled together with the other resin, the risk of the coloration can be supposedly reduced by sorbic acid resulting from hydrolysis of the sorbic acid ester (B). In the present disclosure, the remarkable coloration suppressing effect can be created by these factors.

For example, a sorbic acid ester prepared by condensation of sorbic acid and an alcohol or a phenol derivative is usable as the sorbic acid ester (B) in the present disclosure. Specific examples of the sorbic acid ester include alkyl sorbic acid esters such as methyl sorbate, ethyl sorbate, propyl sorbate, butyl sorbate, and pentyl sorbate, and aryl sorbates such as phenyl sorbate and naphthyl sorbate, which may be used alone or in combination.

Where the acidity of an alcohol resulting from the hydrolysis of the sorbic acid ester (B) is relatively low, the resin is less susceptible to coloration. Therefore, the sorbic acid ester (B) is preferably an alkyl sorbic acid ester, more preferably an alkyl sorbic acid ester containing a C1 to C5 alkoxy group, particularly preferably an alkyl sorbic acid ester containing a C1 to C3 alkoxy group, most preferably methyl sorbic acid ester.

The sorbic acid ester (B) typically has a molecular weight of 120 to 220, preferably 120 to 200, particularly preferably 120 to 160. Where the molecular weight of the sorbic acid ester (B) falls within the aforementioned range, the coloration suppressing effect tends to be efficiently provided.

The proportion of the sorbic acid ester (B) is 0.001 to 10 ppm, preferably 0.001 to 5 ppm, more preferably 0.003 to 4 ppm, based on the total weight of the EVOH (A) and the sorbic acid ester (B). Where the proportion of the sorbic acid ester (B) falls within the aforementioned range, the coloration suppressing effect can be efficiently provided. If the proportion of the sorbic acid ester is too high, the number of the conjugated bonds is too high, thereby supposedly resulting in the coloration.

<Other Thermoplastic Resin (C)>

The inventive resin composition may contain some other thermoplastic resin (C) as the resin component in addition to the EVOH (A) and the sorbic acid ester (B). The proportion of the other resin (C) is typically not greater than 30 wt. % based on the total weight of the EVOH (A) and the other thermoplastic resin (C).

Specific examples of the other thermoplastic resin (C) include: olefin homopolymers and copolymers such as linear low-density polyethylenes, low-density polyethylenes, medium-density polyethylenes, high-density polyethylenes, ethylene-vinyl acetate copolymers, ionomers, ethylene-propylene copolymers, ethylene-$\alpha$-olefin (C4 to C20 $\alpha$-olefin) copolymers, ethylene-acrylate copolymers, polypropylenes, propylene-$\alpha$-olefin (C4 to C20 $\alpha$-olefin) copolymers, polybutenes, and polypentenes; polycycloolefins; polyolefin resins in a broader sense such as products obtained by graft-modifying any of these olefin homopolymers and copolymers with an unsaturated carboxylic acid or an unsaturated carboxylate; and polystyrene resins, polyesters, polyvinyl chlorides, polyvinylidene chlorides, acryl resins, vinyl ester resins, polyester elastomers, polyurethane elastomers, chlorinated polyethylenes, and chlorinated polypropylenes, which may be used alone or in combination.

<Inorganic Filler (D)>

The inventive resin composition may further contain an inorganic filler (D) in addition to the EVOH (A) and the sorbic acid ester (B) in order to improve the gas barrier property.

The inorganic filler (D) is preferably a platy inorganic filler for better gas barrier property. Examples of the inorganic filler include platy particles of kaolin mainly containing hydrous aluminum silicate, mica and smectite (laminar silicate minerals), and talc containing magnesium hydroxide and a silicate, among which kaolin is preferably used. The type of the kaolin is not particularly limited, and the kaolin may be fired or unfired. The fired kaolin is preferred.

The blending of the inorganic filler (D) further improves the gas barrier property of the resin composition. Particularly, the platy inorganic filler has a layered structure. Therefore, where the resin composition is formed into a film, the platy surfaces of the platy inorganic filler are easily oriented along the plane of the film. Particularly, the platy inorganic filler thus oriented along the plane of the film is supposedly contributable to the oxygen barrier property of the resin composition layer (e.g., film).

The proportion of the inorganic filler (D) is typically 1 to 20 parts by weight, preferably 3 to 18 parts by weight, more preferably 5 to 15 parts by weight, based on 100 parts by weight of the EVOH (A). If the proportion is too small, the gas barrier property improving effect tends to be reduced. If the proportion is too high, the transparency tends to be reduced.

<Oxygen Scavenger (E)>

The inventive resin composition may contain an oxygen scavenger (E) in addition to the EVOH (A) and the sorbic acid ester (B) in order to improve the gas barrier property after a hot water sterilization process (retort process).

The oxygen scavenger (E) is a compound or a composite that traps oxygen more quickly than a packaged content. More specifically, the oxygen scavenger may be an inorganic oxygen scavenger, an organic oxygen scavenger, or a composite oxygen scavenger that employs an inorganic catalyst (transition metal catalyst) and an organic compound in combination.

The inorganic oxygen scavenger may be a metal or a metal compound that reacts with oxygen to absorb oxygen. Preferred examples of the metal include metals having a higher ionization tendency than hydrogen (e.g., iron, zinc, magnesium, aluminum, potassium, calcium, nickel, tin, or the like). The metal is typically iron. These metals are preferably used in a powdery form. Any types of iron powder are usable irrespective of the production method. Usable examples of the iron powder include reduced iron powder, atomized iron powder, and electrolyzed iron powder, and are not limited to conventionally known ones. Iron to be used may be iron once oxidized and then reduced. The metal compound is preferably an oxygen-deficient type metal compound. Examples of the oxygen-deficient type metal compound include cerium oxide ($CeO_2$), titanium oxide ($TiO_2$), and zinc oxide (ZnO). These metal oxides are reduced into an oxygen-deficient state with oxygen extracted from crystal lattices thereof, and react with oxygen in an atmosphere, thereby exhibiting the oxygen absorbing capability. These metals and metal compounds preferably each contain a halogenated metal or the like as a reaction promoter.

Examples of the organic oxygen scavenger include hydroxyl-containing compounds, quinone compounds, double bond-containing compounds, and oxidizable resins. A hydroxyl group or a double bond contained in these organic oxygen scavengers reacts with oxygen to absorb oxygen. Preferred examples of the organic oxygen scavenger include ring-opening polymers of cycloalkenes such as polyoctenylenes, and conjugated diene polymers such as of butadiene and their cyclization products.

The composite oxygen scavenger is a combination of the transition metal catalyst and the organic compound. The transition metal catalyst excites oxygen, and the organic compound reacts with oxygen to absorb oxygen. The composite oxygen scavenger is of a composite type in which the organic compound in the composite oxygen scavenger reacts with oxygen more quickly than the packaged content (food or the like) to thereby trap and absorb oxygen. Exemplary transition metals of the transition metal catalyst include titanium, vanadium, chromium, manganese, iron, cobalt, nickel, copper, zinc, zirconium, ruthenium, and palladium, at least one of which is selected. Particularly, cobalt is preferred for compatibility with the resin, catalyst function, and safety. Preferred examples of the organic compound include ring-opening polymers of cycloalkenes such as polyoctenylene, and conjugated diene polymers such as of butadiene and their cyclization products, which are organic oxygen scavengers. Other examples of the organic compound include nitrogen-containing resins such as methyl xylylenediamine (MXD) nylon, tertiary hydrogen-containing resins such as polypropylenes, polyalkylene ether bond-containing resins such as block copolymers having a polyalkylene ether unit, and anthraquinone polymers.

The proportion ratio (weight ratio) of the transition metal catalyst and the organic compound in the composite oxygen scavenger is 0.0001 to 5 wt %, more preferably 0.0005 to 1 wt %, further preferably 0.001 to 0.5 wt. %, on a metal element basis based on the weight of the organic compound.

The proportion of the oxygen scavenger (E) is typically 1 to 30 parts by weight, preferably 3 to 25 parts by weight, more preferably 5 to 20 parts by weight, based on 100 parts by weight of the EVOH (A). The aforementioned oxygen scavengers (E) may be used alone or in combination.

<Drying Agent (F)>

The inventive resin composition may contain a drying agent (F) in addition to the EVOH (A) and the sorbic acid ester (B) in order to improve the gas barrier property after the hot water sterilization process (e.g., boiling process, retort process, and the like).

A generally known hygroscopic compound and a water-soluble drying agent are usable as the drying agent (F) in the present disclosure. For affinity for the EVOH, the water-soluble drying agent is preferred, and a hydratable metal salt is further preferred.

Examples of the hygroscopic compound include silica gel, bentonite, molecular sieve, and highly water-absorbable resins.

Examples of the water-soluble drying agent include sodium chloride, sodium nitrate, sugar, trilithium phosphate, sodium metaphosphate, sodium polyphosphate, and other various hydratable metal salts.

The hydratable metal salts are capable of absorbing water as crystal water. The method of producing such a hydratable metal salt is not particularly limited. For example, a hydratable metal salt prepared by synthesizing a hydrate of a metal salt and then drying and dehydrating the metal salt hydrate may be used. The hydratable metal salt is preferably a fully dehydrated metal salt (metal salt anhydride) for the hygroscopic property, but may be a partially dehydrated metal slat (unsaturated metal salt hydrate).

A metal for the hydratable metal salt is a monovalent, divalent or trivalent metal. Examples of the monovalent metal include alkali metals such as sodium and potassium. Examples of the divalent metal include alkali earth metals such as beryllium, magnesium, and calcium, and transition metals such as copper, zinc, and iron capable of producing divalent ions. Examples of the trivalent metal include aluminum and iron. Particularly, sodium and magnesium are preferred.

Exemplary acids for the hydratable metal salt include sulfuric acid, carboxylic acids, phosphoric acid, boric acid, nitric acid, carbonic acid, and sulfurous acid, among which sulfuric acid, carboxylic acids and phosphoric acid are preferred.

Specific examples of the hydratable metal salt include chlorides such as cobalt chloride, calcium chloride, and magnesium chloride, phosphates such as dihydrogen monosodium phosphate, monohydrogen disodium phosphate, trisodium phosphate, sodium pyrophosphate, and hydrogen calcium phosphate, carboxylates such as disodium succinate, sodium tartrate, and trisodium citrate, and sulfates such as sodium sulfate, potassium sulfate, and magnesium sulfate. Among these salts, the sulfates are preferred for recovery of the gas barrier property after the retort process, and partially dehydrated or fully dehydrated magnesium sulfate is particularly preferred.

The hydratable metal salts are dehydration products of crystal water-containing metal salts. Exemplary crystal water-containing metal sulfates include monovalent metal salts such as sodium sulfate ($Na_2SO_4.10H_2O$) and potassium sulfate ($K_2SO_4.1H_2O$), alkali earth metal salts such as beryllium sulfate ($BeSO_4.4H_2O$), magnesium sulfate ($MgSO_4.7H_2O$), and calcium sulfate ($CaSO_4.2H_2O$), transition metal salts such as copper sulfate ($CuSO_4.5H_2O$), zinc sulfate ($ZnSO_4.7H_2O$), and iron sulfate ($FeSO_4.7H_2O$), and aluminum sulfate ($Al_2(SO_4)_3.16H_2O$). The parenthesized compounds are each represented by a chemical formula of a saturated hydrate of a metal salt.

The hydratable metal salt may be a partial dehydration product or a full dehydration product of the saturated hydrate of the metal salt. The partial dehydration product is prepared by removing a part of the crystal water from the saturated hydrate. Provided that the weight of the crystal water of the saturated hydrate of the metal salt is 100%, the partial dehydration product is typically a hydrate of the metal salt having a crystal water content of less than 90%. It is preferred to use a partial dehydration product of a saturated hydrate stable at an ordinary temperature. Therefore, a partial hydrate of the metal salt having a crystal water content of less than 70% is preferably used. More preferably, the full dehydration product of the metal salt having a crystal water content of 0% is used as the hydratable metal salt.

The mixing weight ratio (F/A) of the drying agent (F) to the EVOH (A) is typically 50/50 to 1/99, preferably 30/70 to 1/99, more preferably 20/80 to 5/95, particularly preferably 15/85 to 5/95. Where the drying agent (F) is the partial dehydration product of the crystal water-containing metal salt, the mixing weight ratio (F/A) is based on the weight of the full dehydration product.

If the proportion of the drying agent (F) is too high, the resin composition tends to be poorer in transparency, or is liable to clog a screen mesh of a molding machine due to coagulation thereof. If the proportion of the drying agent (F) is too low, the function of removing water from the EVOH (A) tends to be insufficient and, therefore, the gas barrier property tends to be insufficient after the hot water sterilization process such as the boiling process or the retort process. The aforementioned drying agents (F) may be used alone or in combination.

<Other Additives (G)>

In addition to the aforementioned ingredients, as required, the inventive resin composition may contain known additives in proportions that do not impair the effects of the present disclosure (e.g., in proportions of less than 5 wt. % of the overall weight of the resin composition). Examples of the additives include: a plasticizer such as an aliphatic polyhydric alcohol (e.g., ethylene glycol, glycerin, hexanediol, or the like); a lubricant such as a saturated aliphatic amide (e.g., stearamide, or the like), an unsaturated fatty acid amide (e.g., oleamide, or the like), a bis-fatty acid amide (e.g., ethylene bis(stearamide), or the like), and a low-molecular weight polyolefin (e.g., a low-molecular weight polyethylene or a low-molecular weight polypropylene having a molecular weight of about 500 to about 10,000, or the like); a thermal stabilizer; a photo stabilizer; a flame retarder; a crosslinking agent; a curing agent; a foaming agent; a crystal nucleating agent; an anti-hazing agent; a biodegrading additive; a silane coupling agent; an anti-blocking agent; an antioxidant; a colorant; an antistatic agent; a UV absorber; an antibacterial agent; an insoluble inorganic salt (e.g., hydrotalcites, or the like); a surfactant and a wax; and a dispersant (e.g., calcium stearate, monoglyceride stearate, or the like), which may be used alone or in combination.

The thermal stabilizer may be added to the resin composition in order to improve the thermal stability and other physical properties during the melt forming process. Examples of the thermal stabilizer include: organic acids such as acetic acid, propionic acid, butyric acid, lauric acid, stearic acid, oleic acid, and behenic acid, and their alkali metal salts (their sodium salts, potassium salts, and the like), their alkali earth metal salts (their calcium salts, magnesium salts, and the like), their zinc salts, and their other metal salts; inorganic salts such as sulfuric acid, sulfurous acid, carbonic acid, phosphoric acid, and boric acid, and their alkali metal salts (their sodium salts, potassium salts, and the like), their alkali earth metal salts (their calcium salts, magnesium salts, and the like), their zinc salts, and their other metal salts.

Of these, acetic acid, boron compounds such as boric acid and a borate, an acetate, and a phosphate are particularly preferred.

Where acetic acid is added, the proportion of acetic acid is typically 0.001 to 1 part by weight, preferably 0.005 to 0.2 parts by weight, particularly preferably 0.01 to 0.1 part by weight, based on 100 parts by weight of the EVOH (A). If the proportion of acetic acid is too low, it will be impossible to sufficiently provide the effect of the addition of acetic acid. If the proportion of acetic acid is too high, on the other hand, it will be difficult to provide a uniform film.

Where any of the boron compounds is added, the proportion of the boron compound is typically 0.001 to 1 part by weight on a boron basis based on 100 parts by weight of the EVOH (A) (as determined through analysis by the ICP emission spectrometry after incineration of the boron compound). If the proportion of the boron compound is too low, it will be impossible to sufficiently provide the effect of the addition of the boron compound. If the proportion of the boron compound is too high, on the other hand, it will be difficult to provide a uniform film.

The proportion of the acetate or the phosphate (including a hydrogen phosphate) is typically 0.0005 to 0.1 part by weight on a metal basis based on 100 parts by weight of the EVOH (A) (as determined through analysis by the ICP emission spectrometry after incineration of the salt). If the proportion is too low, it will be impossible to sufficiently provide the effect of the addition of the salt. If the proportion is too high, on the other hand, it will be difficult to provide a uniform film. Where two or more of the salts are added to the EVOH (A), the total proportion of the two or more salts preferably falls within the aforementioned range.

Exemplary methods for blending the thermal stabilizer such as acetic acid, the boron compound, the acetate or the phosphate with the EVOH (A) include: i) a method including the steps of bringing a porous deposit of an EVOH (A) having a water content of 20 to 80 wt. % into contact with an aqueous solution of the thermal stabilizer, allowing the porous deposit of the EVOH (A) to contain the thermal stabilizer, and drying the porous deposit; ii) a method including the steps of allowing a homogenous solution (water/alcohol solution) of the EVOH (A) to contain the thermal stabilizer, extruding the solution into strands in a solidification liquid, cutting the strands into pellets, and drying the pellets; iii) a method including the steps of mixing the EVOH (A) and the thermal stabilizer together, and melt-kneading the resulting mixture by an extruder or the like; and (iv) a method including the steps of neutralizing an alkali (sodium hydroxide, potassium hydroxide or the like) used in the saponification step with an organic acid (acetic acid or the like) in the EVOH production process, and controlling the amounts of the organic acid (acetic acid or the like) and a by-produced acid salt remaining in the EVOH (A) by rinsing the EVOH (A) with water.

The methods i) and ii), which ensure homogenous dispersing of the thermal stabilizer, are preferred in order to reliably provide the effects of the disclosure, and the method iv) is preferred if the organic acid or its salt is to be contained in the resin composition.

The EVOH (A) is a base resin for the inventive resin composition. Therefore, the proportion of the EVOH (A) is typically not less than 70 wt. %, preferably not less than 80 wt. %, particularly preferably not less than 90 wt. %, based on the overall weight of the resin composition. If the proportion of the EVOH (A) is too high, the effects of the addition of the ingredients (B), (C), (D), (E), (F), or/and (G) tend to be reduced. If the proportion of the EVOH (A) is too low, the gas barrier property tends to be poorer.

<Resin Composition Preparation Method>

The inventive resin composition is prepared in the following manner by way of example but not by way of limitation. The resin composition may be prepared by blending the predetermined proportions of the EVOH (A) and the sorbic acid ester (B) and melt-kneading the resulting mixture (melt-kneading method), or by dry-blending the predetermined proportions of the EVOH (A) and the sorbic acid ester (B) (dry-blending method).

Alternatively, the inventive resin composition may be prepared in a desired concentration by blending predetermined proportions of the EVOH (A) and the sorbic acid ester (B) to prepare a composition (master batch) having a higher sorbic acid ester concentration, and blending the composition (master batch) with the EVOH (A).

Exemplary blending methods for the mixing include a dry-blending method using a Banbury mixer or the like, and a method including the steps of melt-kneading the ingredients by a single-screw or twin-screw extruder, and pelletizing the resulting mixture. The melt-kneading temperature is typically 150° C. to 300° C., preferably 170° C. to 250° C.

The inventive resin composition may be melt-formed immediately after the melt-kneading of the ingredients. However, it is preferred in terms of industrial handling to pelletize the resin composition after the melt-kneading, and melt-form a product from the resulting resin composition pellets. For the pelletization, it is preferred, for economy, to melt-knead the resin composition by means of an extruder, extrude the resin composition into strands, and cut the strands into the pellets.

Even if the resin composition is melt-kneaded a plurality of times as described above in the present disclosure, the resin composition suppresses the coloration of the finally obtained formed product.

The pellets each have, for example, a spherical shape (a round shape or an oval shape), a cylindrical shape, a cubic shape, or a square prism shape, and typically a spherical shape or a cylindrical shape. The spherical pellets typically each have a diameter of 1 to 6 mm, preferably 2 to 5 mm, and typically each have a height of 1 to 6 mm, preferably 2 to 5 mm, for easier handling thereof as a forming material. Where the spherical pellets have a minor diameter and a major diameter, the aforementioned diameter means the major diameter. The cylindrical pellets typically each have a bottom diameter of 1 to 6 mm, preferably 2 to 5 mm, and typically each have a length of 1 to 6 mm, preferably 2 to 5 mm.

A lubricant is preferably applied to surfaces of the resulting resin composition pellets in order to stabilize the feedability of the pellets in the melt-forming process. Examples of the lubricant include higher fatty acids (e.g., lauric acid, myristic acid, palmitic acid, stearic acid, behenic acid, oleic acid, and the like), higher fatty acid metal salts (aluminum salts, calcium salts, zinc salts, magnesium salts, barium salts, and the like of the higher fatty acids), higher fatty acid esters (methyl esters, isopropyl esters, butyl esters, octyl esters, and the like of the higher fatty acids), higher fatty acid amides (saturated fatty acid amides such as stearamide and behenamide, unsaturated fatty acid amides such as oleamide and erucamide, and bis fatty acid amides such as ethylene bisstearamide, ethylene bisoleamide, ethylene biserucamide, and ethylene bislauramide), low-molecular weight polyolefins (e.g., low-molecular weight polyethylenes and low-molecular weight polypropylenes having a molecular weight of about 500 to about 10000, and acid-modified products of these low-molecular weight polyolefins), higher alcohols, ester oligomers, and fluorinated ethylene resins. At least one of the higher fatty acids and their metal salts, esters and amides is preferred, and at least one of the higher fatty acid metal salts and the higher fatty acid amides is further preferred. These lubricants may be used alone or in combination.

The lubricant is used in a solid form (a powdery form, a particulate form, a flake form or the like), a semisolid form, a liquid form, a paste form, a solution form, an emulsion form (aqueous dispersion form), or any other form. The lubricant is preferably in the emulsion form for efficient production of the resin composition pellets intended by the present disclosure.

Exemplary methods for applying the lubricant on the surfaces of the resin composition pellets include: a method in which the lubricant and the resin composition pellets are mixed together by a blender; a method in which the resin composition pellets are immersed in a solution or a dispersion of the lubricant; and a method in which a solution or a dispersion of the lubricant is sprayed over the resin composition pellets. For uniform application of the lubricant, it is preferred to feed the resin composition pellets in a blender or the like and, with stirring, gradually feed an emulsion of the lubricant over the resin composition pellets at a rate of 0.001 to 1 part by weight/hour, preferably 0.01 to 0.1 part by weight/hour, on a solid lubricant basis based on 100 parts by weight of the resin composition pellets. In order to ensure that the lubricant applied to the pellets intimately adheres to the surfaces of all the resin composition pellets without separation of the lubricant in the melt-forming machine, the surfaces of the resin composition pellets to be brought into contact with the lubricant are preferably kept at a temperature that is higher than the lubricant melting point minus 50° C. and is lower than the melting point of the EVOH.

The proportion of the lubricant is typically 10 to 1000 ppm, preferably 20 to 500 ppm, particularly preferably 50 to 250 ppm, based on the overall weight of the resin composition pellets for the stabilization of the feedability of the resin composition in the melt-forming process.

<Formed Product>

The inventive resin composition can be formed into various products such as a film, a cup, and a bottle by a melt-forming process. Examples of the melt-forming process include an extrusion process (T-die extrusion, inflation extrusion, blowing, melt-spinning, profile extrusion, and the like), and an injection molding process. A melt-forming temperature is typically selected from a range of 150° C. to 300° C., preferably 180° C. to 250° C. In the present disclosure, the term "film" is not intended to be discriminated from "sheet" and "tape" but collectively means the film, the sheet, and the tape.

The product melt-formed from the inventive resin composition may be used as it is for various applications. At this time, a layer (or a single-layer film) of the resin composition typically has a thickness of 1 to 5000 µm, preferably 5 to 4000 µm, particularly preferably 10 to 3000 µm.

The layer (or the single layer film) of the resin composition contains the EVOH (A) and the specific very small proportion of the sorbic acid ester (B). The layer of the resin composition is formed from the resin composition prepared in the aforementioned manner typically through the melt-forming process. The proportion (ppm) of the sorbic acid ester (B) in the resin composition is determined, for example, through quantitative analysis by liquid chromatography mass spectrometry (LC/MS).

<Multilayer Structure>

The inventive multilayer structure includes at least one layer of the inventive resin composition. The layer of the inventive resin composition (hereinafter referred to simply as "resin composition layer") may be imparted with a higher strength and other functions by stacking a layer of some other base material thereon.

A thermoplastic resin other than the EVOH (hereinafter referred to as "other base resin") is preferably used as the base material.

Where layers a (a1, a2, . . . ) of the inventive resin composition and layers b (b1, b2, . . . ) of the other base resin are stacked to form the multilayer structure, possible combinations of the layers a and the layers b for the layered configuration of the multilayer structure include a/b, b/a/b, a/b/a, a1/a2/b, a/b1/b2, b2/b1/a/b1/b2, b2/b1/a/b1/a/b1/b2, and the like.

As required, an adhesive resin layer may be provided between layers in the above layered configuration. Where the multilayer structure includes recycle layers R obtained by recycling cutoff pieces and defective products occurring during the production of the multilayer structure and melt-forming the recycled material (a mixture including the inventive resin composition and the other base resin or a mixture including the inventive resin composition, the other base resin, and the adhesive resin), possible combinations of the layers a, the layers b and the layers R for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10.

The layered configuration of the inventive multilayer structure preferably includes, as a structural unit, at least a base unit including the inventive resin composition layer as an intermediate layer, and other base resin layers provided as outer layers on opposite sides of the intermediate layer (b/a/b, or b/adhesive resin layer/a/adhesive resin layer/b).

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure at a main chain and/or a side chain); polyolefin resins in a broader sense including modified olefin resins such as unsaturated carboxylic-modified polyolefin resins obtained by graft-modifying any of the aforementioned polyolefin resins with an unsaturated carboxylic acid or an unsaturated carboxylate; ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acryl resins, polystyrene resins, vinyl ester resins, polyester elastomers, polyurethane elastomers, halogenated polyolefins such as chlorinated polyethylenes and chlorinated polypropylenes, and aromatic and aliphatic polyketones.

Of these resins, the polyamide resins, the polyolefin resins, the polyester resins, and the polystyrene resins, which are hydrophobic resins, are preferred in consideration of the hydrophobicity. Further, the polyolefin resins such as the polyethylene resins, the polypropylene resins, and the polycycloolefin resins, and the unsaturated carboxylic-modified polyolefin resins obtained by modifying these polyolefin resins are more preferred, and the polycycloolefin resins are particularly preferred.

Known adhesive resins are usable as the adhesive resin for formation of the adhesive resin layer. The adhesive resin is properly selected according to the type of the thermoplastic resin to be used for the base resin layer (b). Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride, which may be used alone or in combination.

The other base resin and the adhesive resin may contain a conventionally known plasticizer, filler, clay (montmorillonite or the like), colorant, antioxidant, antistatic agent, lubricant, nucleating agent, antiblocking agent, UV absorber, wax, and the like in proportions that do not impair the effects of the present disclosure (e.g., in proportions of not greater than 30 wt. %, preferably not greater than 10 wt. %).

A known stacking method may be employed for stacking the layer of the inventive resin composition and the layer of the other base resin (optionally with the adhesive resin layer provided between the layers). Examples of the stacking method include: a method in which a film or a sheet of the inventive resin composition is laminated with the other base resin by melt extrusion; a method in which the other base resin layer is laminated with the inventive resin composition by melt extrusion; a method in which the resin composition and the other base resin are coextruded; a method in which the film (layer) of the inventive resin composition and the layer of the other base resin are separately formed, and bonded together by dry laminating with the use of a known adhesive agent such as of an organic titanium compound, an isocyanate compound, a polyester compound or a polyurethane compound; and a method in which a solution of the inventive resin composition is applied on the other base resin layer and a solvent is removed from the applied solution. Of these methods, the coextrusion method is preferred in consideration of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. A roll stretching method, a tenter stretching method, a tubular stretching method, a stretch blowing method or a vacuum pressure forming method having a higher stretch ratio may be employed for the stretching process. A temperature for the stretching is typically selected from a range of about 40° C. to about 170° C., preferably about 60° C. to about 160° C. If the stretching temperature is too low, poorer stretchability will result. If the stretching temperature is too high, it will be difficult to ensure stable stretching.

The resulting multilayer structure may be further subjected to a heat-setting process to ensure dimensional stability after the stretching. The heat-setting process may be performed in a known manner. For example, the stretched multilayer structure (stretched film) is typically heat-treated at 80° C. to 180° C., preferably 100° C. to 165° C., for about 2 to about 600 seconds, while being kept tense.

Where the stretched multilayer film produced by using the inventive resin composition is used as a shrinkable film, for example, the stretched film may be cold-set so as to be imparted with a heat-shrinkable property by applying cold air over the stretched film without performing the above heat-setting process.

In some case, a cup-shaped or tray-shaped multilayer container may be produced from the inventive multilayer structure. For the production of the multilayer container, an ordinary drawing process is employed. Specific examples of the drawing process include a vacuum forming method, a pressure forming method, a vacuum pressure forming method, and a plug-assisted vacuum pressure forming method. Where a tube-shaped or bottle-shaped multilayer container is produced from a multilayer parison (a hollow tubular preform to be blown), a blow molding process is employed. Specific examples of the blow molding process include an extrusion blow molding method (a twin head type, a mold shift type, a parison shift type, a rotary type, an accumulator type, a horizontal parison type, and the like), a cold parison blow molding method, an injection blow molding method, and a biaxial stretching blow molding method (an extrusion type cold parison biaxial stretching blow molding method, an injection type cold parison biaxial stretching blow molding method, an injection inline type biaxial stretching blow molding method, and the like). As required, the inventive multilayer structure may be subjected to a heating process, a cooling process, a rolling process, a printing process, a dry laminating process, a solution or melt coating process, a bag forming process, a deep drawing process, a box forming process, a tube forming process, a splitting process, or the like.

The thickness of the inventive multilayer structure (or the stretched multilayer structure) and the thicknesses of the resin composition layer, the other base resin layer and the adhesive resin layer of the multilayer structure are properly set according to the layered configuration, the type of the base resin, the type of the adhesive resin, and the use purpose, the package shape, the required physical properties, and the like of the multilayer structure. Where the resin composition layer, the adhesive resin layer and the other base resin layer each include two or more layers, the following thickness value is the total thickness of the layers of the same type.

The thickness of the inventive multilayer structure (or the stretched multilayer structure) is typically 10 to 5000 µm, preferably 30 to 3000 µm, particularly preferably 50 to 2000 µm. If the overall thickness of the multilayer structure is too low, the multilayer structure tends to be poorer in gas barrier property. If the overall thickness of the multilayer structure is too high, the multilayer structure tends to have an excessive gas barrier property and requires the ingredients in amounts greater than necessary, resulting in poorer economy. The thickness of the resin composition layer is typically 1 to 500 μm, preferably 3 to 300 μm, particularly preferably 5 to 200 μm. The thickness of the other base resin layer is typically 5 to 3000 μm, preferably 10 to 2000 μm, particularly preferably 20 to 1000 μm. The thickness of the adhesive resin layer is typically 0.5 to 250 μm, preferably 1 to 150 μm, particularly preferably 3 to 100 μm.

The thickness ratio between the resin composition layer and the other base resin layer of the multilayer structure (resin composition layer/other base resin layer) (if these layers each include a plurality of layers, the thickness ratio between the thickest one of the resin composition layers and the thickest one of the other base resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and lids produced from the film or the stretched film formed in the aforementioned manner are useful as packaging material containers for general foods, condiments such as mayonnaise and dressing, fermented foods such as miso, fat and oil such as salad oil, beverages, cosmetics, and pharmaceutical products.

In particular, the layer of the inventive resin composition is excellent in coloration resistance even if being subjected to the melt-forming process or the like a plurality of times and hence frequently subjected to the thermal history. Therefore, the layer of the inventive resin composition is useful for containers for general foods, condiments such as mayonnaise and dressing, fermented foods such as miso, fat and oil such as salad oil, soup, cosmetics, pharmaceutical products, detergents, perfumes, industrial chemicals, agricultural chemicals, fuels, and the like. Particularly, the layer of the inventive resin composition is useful for: bottle-shaped containers and tube-shaped containers for semisolid foods and condiments such as mayonnaise, ketchup, sauce, miso, wasabi, mustard, and barbecue sauce, and the like, and for liquid beverages and condiments such as salad oil, mirin, sake, beer, wine, juice, tea, sports drink, mineral water, milk, and the like; cup-shaped containers for semisolid foods and condiments such as fruit, jerry, pudding, yogurt, mayonnaise, miso, processed rice, cooked food, soup, and the like; wide-mouthed containers for raw meat, processed meat (ham, bacon, sausage, and the like), cooked rice, and pet food; and other packaging materials.

[Quantitative Determination of Sorbic Acid Ester (B)]

For determination of the sorbic acid ester content of the resin composition pellets, a sample is prepared by milling (freeze-milling) the pellets by a given method and dissolving the resulting powder in a C1 to C5 lower alcohol. The sample is analyzed by liquid chromatography mass spectrometry (LC/MS/MS) for the determination of the sorbic acid ester content. For determination of the sorbic acid ester content of the formed product of the multilayer structure or the like, the resin composition layer is extracted from the multilayer structure by a given method, and a sample is prepared by milling (freeze-milling) the resin composition layer by a given method and dissolving the resulting powder in a C1 to C5 lower alcohol. The sample is analyzed by liquid chromatography mass spectrometry (LC/MS/MS) for the determination of the sorbic acid ester content.

EXAMPLES

The present disclosure will hereinafter be described more specifically by way of examples thereof. However, it should be understood that the present disclosure be not limited to the examples within the scope of the present disclosure. In the following examples, "parts" means "parts by weight".

(1) Coloration Evaluation Method

An evaluation sample was prepared by heating evaluation sample pellets at 230° C. for 20 minutes or 30 minutes by means of GEAR OVEN GPHH-200 available from Tabai Espec Corporation. The YI value of the evaluation sample was measured by means of a color difference spectrometer SE6000 available from Nippon Denshoku Industries Co., Ltd. A lower YI value means that the coloration was effectively suppressed.

The evaluation sample was evaluated for coloration degree after heating for a longer period of time (i.e., 20 minutes or 30 minutes), assuming that the EVOH is frequently subjected to thermal history, for example, when a product melt-formed from the EVOH is recycled.

Example 1

A saponified ethylene-vinyl acetate copolymer (having an ethylene structural unit content of 32 mol %, an MFR of 4.0 g/10 minutes (as measured at 210° C. with a load of 2160 g) was used as the EVOH (A). Methyl sorbate available from Tokyo Chemical Industry Co., Ltd. was used as the sorbic acid ester (B).

Methyl sorbate was added to the EVOH (A) in a proportion of 3000 ppm based on the total weight of the EVOH (A) and the sorbic acid ester (B). A master batch was prepared by melt-kneading the resulting mixture under the following extruder conditions (1) by means of a 20-mm diameter twin-screw extruder. The master batch thus prepared was diluted with the EVOH (A) to adjust the proportion of methyl sorbate to a level shown in Table 1. Resin composition pellets were produced by melt-kneading the resulting resin composition under the extruder conditions (1).

(Extruder Conditions (1) for Preparation of Resin Composition)
Screw inner diameter: 20 mm
L/D: 25
Screw rotation speed: 100 rpm
Die: Two-hole strand die
Extruder temperatures: 180° C. at C1, 240° C. at C2, 240° C. at C3, and 240° C. at C4

Next, 5 parts by weight of the resulting resin composition pellets and 5 parts by weight of an adhesive resin (PLEXAR PX6002 available from LyondellBasell Inc. and having an MFR of 2.7 g/10 minutes (as measured at 230° C. with a load of 2160 g)) were added to 90 parts by weigh of a polypropylene (NOVATECH EA7AD available from Japan Polypropylene Corporation and having an MFR of 1.4 g/10 minutes (as measured at 230° C. with a load of 2160 g)), and the resulting mixture was melt-kneaded under the following extruder conditions (1') by means of a 20-mm diameter twin-screw extruder. Thus, model recycled pellets of Example 1 shown below in Table 1 were prepared, and evaluated by the aforementioned coloration evaluation method. The results are shown below in Table 1.

The model recycled pellets had a formulation assumed to be obtained by recycling a product melt-formed from the EVOH.

(Extruder Conditions (1') for Preparation of Model Recycled Pellets)
Screw inner diameter: 20 mm
L/D: 25
Screw rotation speed: 100 rpm
Die: Two-hole strand die
Extruder temperatures: 150° C. at C1, 240° C. at C2, 240° C. at C3, and 240° C. at C4

Comparative Example 1

Model recycled pellets were prepared and evaluated in substantially the same manner as in Example 1, except that methyl sorbate was not added. The evaluation results are shown below in Table 1.

Comparative Example 2

Model recycled pellets were prepared and evaluated in substantially the same manner as in Example 1, except that the proportion of methyl sorbate was 30 ppm based on the total weight of the EVOH (A) and the sorbic acid ester (B). The evaluation results are shown below in Table 1.

TABLE 1

|  | Example 1 | Comparative Example 1 | Comparativ Example 2 |
| --- | --- | --- | --- |
| sorbic acid ester | Methyl sorbate | Methyl sorbate | Methyl sorbate |
| Proportion (ppm) | 3 | 0 | 30 |
| Coloration (YI value) | | | |
| Heated for 20 minutes | 10 | 14 | 13 |
| Heated for 30 minutes | 35 | 43 | 38 |

Example 1 relates to the inventive EVOH composition containing the specific very small proportion of the sorbic acid ester. Surprisingly, the composition of Example 1 had a YI value of 10 after the heating for 20 minutes and a YI value of 35 after the heating for 30 minutes, although containing the sorbic acid ester in a very small proportion (i.e., 3 ppm). Unexpectedly, the YI values were lower than those in Comparative Example 2 in which the sorbic acid ester was blended in a proportion of 30 ppm.

Example described above indicates that the inventive composition surprisingly has a very high coloration suppressing effect only when the sorbic acid ester is blended in the specific very small proportion.

Subsequently, resin composition pellets and model recycled pellets were prepared and evaluated in substantially the same manner, except that the extruder conditions were changed.

Example 2

A master batch was prepared in substantially the same manner as in Example 1 by adding methyl sorbate to the EVOH (A) in a proportion of 500 ppm based on the total weight of the EVOH (A) and the sorbic acid ester (B), and melt-kneading the resulting mixture under the following extruder conditions (2) by means of a 20-mm diameter twin-screw extruder. The master batch was diluted with the EVOH (A) to adjust the proportion of methyl sorbate to a level shown in Table 2. Resin composition pellets were produced by melt-kneading the resulting resin composition under the extruder conditions (2).

(Extruder Conditions (2) for Preparation of Resin Composition)
Screw inner diameter: 20 mm
L/D: 50
Screw rotation speed: 300 rpm
Die: Two-hole strand die
Extruder temperatures: 180° C. at C1, 210° C. at C2, 230° C. at C3, 240° C. at C4, 240° C. at C5, and 240° C. at C6

Next, model recycled pellets of Example 2 were prepared in substantially the same manner as in Example 1, except that the extruder conditions were changed to the following extruder conditions (2'). The model recycled pellets were evaluated by the aforementioned coloration evaluation method. The results are shown below in Table 2.

(Extruder Conditions (2') for Preparation of Model Recycled Pellets)
Screw inner diameter: 20 mm
L/D: 50
Screw rotation speed: 300 rpm
Die: Two-hole strand die
Extruder temperatures: 150° C. at C1, 180° C. at C2, 230° C. at C3, 240° C. at C4, 240° C. at C5, and 240° C. at C6

Example 3

Resin composition pellets were prepared in substantially the same manner as in Example 2, except that ethyl sorbate (available from Tokyo Chemical Industry Co., Ltd.) was used instead of methyl sorbate. Thereafter, model recycled pellets were prepared and evaluated in substantially the same manner as in Example 2, except that the proportion of ethyl sorbate was 5 ppm based on the total weight of the EVOH (A) and the sorbic acid ester (B). The results are shown below in Table 2.

Comparative Example 3

Model recycled pellets were prepared and evaluated in substantially the same manner as is Example 2, except that the proportion of methyl sorbate was 15 ppm based on the total weight of the EVOH (A) and the sorbic acid ester (B). The evaluation results are shown below in Table 2.

TABLE 2

|  | Example 2 | Example 3 | Comparative Example 3 |
| --- | --- | --- | --- |
| sorbic acid ester | Methyl sorbate | Ethyl sorbate | Methyl sorbate |
| Proportion (ppm) | 0.5 | 5 | 15 |
| Coloration (YI value) | | | |
| Heated for 20 minutes | 15 | 17 | 19 |
| Heated for 30 minutes | 23 | 24 | 26 |

Examples 2 and 3 relate to the inventive EVOH composition containing the specific very small proportion of the sorbic acid ester. The composition of Example 2 had a YI value of 15 after the heating for 20 minutes and a YI value of 23 after the heating for 30 minutes, although containing the sorbic acid ester in a very small proportion (i.e., 0.5 ppm). The composition of Example 3 had a YI value of 17 after the heating for 20 minutes and a YI value of 24 after the heating for 30 minutes, although containing the sorbic acid ester in a small proportion (i.e., 5 ppm). The YI values were lower than those in Comparative Example 3 in which the sorbic acid ester was blended in a proportion of 15 ppm.

Examples described above indicate that the effects of the present disclosure can be provided irrespective of the type of the sorbic acid ester and the extruder conditions.

While specific forms of the embodiments of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The inventive resin composition contains the EVOH (A) and the specific very small proportion of the sorbic acid ester (B). Therefore, the resin composition is less susceptible to coloration even if the EVOH contained in the resin composition is subjected to the thermal history a plurality of times when a product formed from the EVOH-containing resin composition is recycled to be formed into another product or when the resin properties are adjusted by melt-kneading the EVOH together with another resin and an additive and the resulting resin composition is melt-formed into a product. Thus, the product formed from the inventive resin composition and the multilayer structure including the layer of the inventive resin composition are particularly useful for various packaging materials for foods.

The invention claimed is:

1. A resin composition comprising:
   (A) a saponified ethylene-vinyl ester copolymer; and
   (B) a sorbic acid ester;
   wherein the sorbic acid ester (B) is a methyl sorbate, and is present in a proportion of 0.001 to 10 ppm based on a total weight of the saponified ethylene-vinyl ester copolymer (A) and the sorbic acid ester (B).

2. A product comprising the resin composition according to claim 1.

3. A multilayer structure comprising at least one resin composition layer comprising the resin composition according to claim 1.

* * * * *